United States Patent [19]

Joynes

[11] Patent Number: 5,212,594
[45] Date of Patent: May 18, 1993

[54] ROTATABLE JOINTS FOR COMMUNICATION LINES

[75] Inventor: George M. S. Joynes, Romsey, Great Britain

[73] Assignee: Roke Manor Research Limited, Romsey, England

[21] Appl. No.: 799,127

[22] Filed: Nov. 27, 1991

[30] Foreign Application Priority Data

Dec. 7, 1990 [GB] United Kingdom ............... 9026669

[51] Int. Cl.$^5$ ..................... G02B 5/30; G02B 27/28
[52] U.S. Cl. .................... 359/494; 359/495; 359/497
[58] Field of Search ............... 359/486, 487, 494, 495, 359/497

[56] References Cited

U.S. PATENT DOCUMENTS

| | | | |
|---|---|---|---|
| 2,432,432 | 12/1947 | MacNeille | 359/487 |
| 4,685,773 | 8/1987 | Carlsen et al. | 359/495 |

FOREIGN PATENT DOCUMENTS

| | | | |
|---|---|---|---|
| 56-137307 | 10/1981 | Japan | 359/495 |
| 59-204024 | 11/1984 | Japan | 359/495 |
| 62-164028 | 7/1987 | Japan | 359/495 |
| 62-239123 | 10/1987 | Japan | 359/495 |
| 63-163433 | 7/1988 | Japan | 359/495 |
| 3-21931 | 1/1991 | Japan | 359/495 |

Primary Examiner—Martin Lerner
Attorney, Agent, or Firm—Keck, Mahin & Cate

[57] ABSTRACT

A communication line joint arrangement comprising two parts between which relative rotation and the transmission of at least two channels using electromagnetic energy such as light is facilitated, each part comprising polarising beam splitter means operatively associated with quarter wave plate means, wherein the polarising beam splitter means of the two parts are arranged to pass two orthogonally related polarised input channel signals to the quarter wave plate means associated therewith, so as to produce two corresponding circularly polarised channel signals of opposite directional sense which are transmitted between the quarter wave plate means, across an interface between the parts, so as to produce two corresponding orthogonally polarised output channel signals from the polarising beam splitter means. By arranging that the two channel signals are circularly polarised in opposite senses as they traverse the interface between the two relatively rotatable parts, mutual interference between channels and/or breakdown of communication in the presence of rotation between the parts is thereby obviated.

12 Claims, 1 Drawing Sheet

PBS - POLARISING BEAM SPLITTER
(SEVERAL TYPES POSSIBLE)

$\lambda/4$ - QUARTER WAVE PLATE

⌒ — } ORTHOGONAL PLANES OF
⌒ ⊙ } POLARISATION

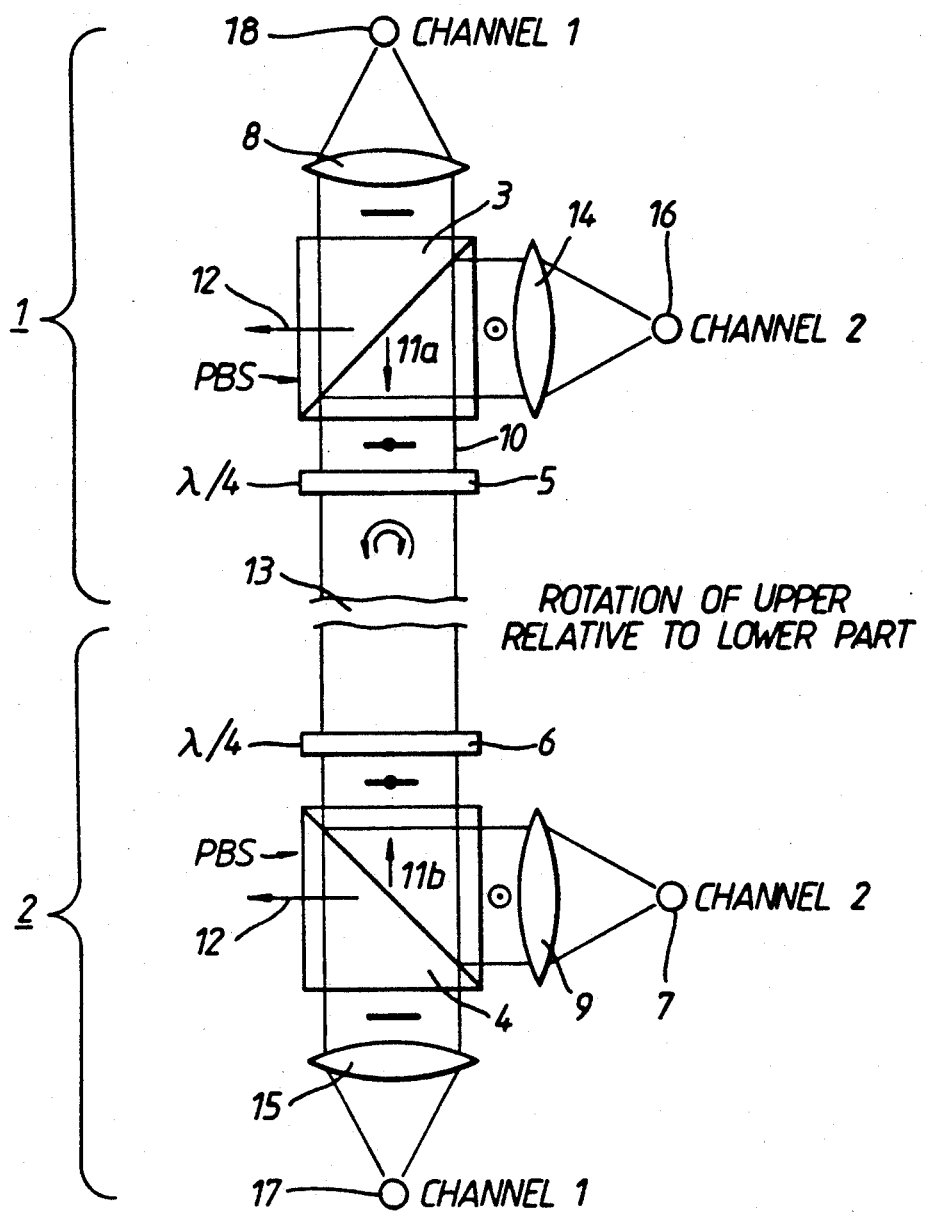

ROTATABLE JOINTS FOR COMMUNICATION LINES

1. FIELD OF THE INVENTION

This invention relates to rotatable joints for communication lines and more especially it relates to joints for lines required to carry a plurality of communication channels using electromagnetic energy such as light for example. The term line when used herein is defined to include optical fibres, light pipes which may be solid or hollow, or waveguides or the like, all of which being suitable for the transmission of polarised electromagnetic energy.

2. SUMMARY OF THE INVENTION

According to the present invention a communication line joint arrangement comprises two parts between which relative rotation and the transmission of at least two channels using electromagnetic energy is facilitated, each part comprising beam splitter means operatively associated with quarter wave plate means, wherein the beam splitter means of the two parts are arranged to pass two orthogonally related polarised input channel signals to the quarter wave plate means associated therewith, so as to produce two corresponding circularly polarised channel signals of opposite directional sense which are transmitted between the quarter wave plate means, across an interface between the parts, so as to produce two corresponding orthogonally polarised output channel signals from the beam splitter means.

By arranging that the two channel signals are circularly polarised in opposite senses as they traverse the interface between the two relatively rotatable parts, mutual interference between channels and/or breakdown of communication in the presence of rotation between the parts is thereby obviated.

According to one aspect of the present invention the two beam splitter means may be fed with the two channel signals one to each beam splitter means such that the beam splitter means of each of the two parts is arranged to produce corresponding orthogonally related polarised channel signals which are fed to the quarter wave plate means associated therewith so as to produce two corresponding circularly polarised channel signals of opposite directional sense, which propagate in opposite directions between the quarter wave plate means to the beam splitter means thereby to produce the two output channel signals one from each of the beam splitter means.

According to an alternative aspect of the present invention two input channel signals may be fed to one of the two beam splitter means so that the beam splitter means of one of the two parts is arranged to produce when fed with the two input channel signals, two corresponding orthogonally related polarised channel signals which are fed to the quarter wave plate means associated therewith so as to produce two corresponding circularly polarised channel signals of opposite directional sense, which propagate in the same direction, which circularly polarised channel signals are fed to the quarter wave plate means of the other of the two parts so as to produce corresponding orthogonally polarised channel signals which are fed to the beam splitter means of the other of the two parts thereby to produce two output channel signals which correspond to the input channel signals.

Each beam splitter means may be an optical beam signal splitter and each quarter wave plate means may be an optical quarter wave plate such that the transmission of two channels comprising light signals is facilitated.

The arrangement may be operatively associated with two light sources one for each channel, and two optical detectors one for each channel.

The light sources may comprise lasers.

The lasers may be chosen to provide polarised light.

The beam splitter means may be polarising splitter means.

Alternatively each beam splitter means may be a grid polariser and each quarter wave plate means may be a circular polariser such that transmission of two channels comprising microwave energy is facilitated.

According to this alternative embodiment, the arrangement may be operatively associated with two microwave signal generators one for each channel and two microwave signal detectors one for each channel.

It will be readily appreciated that the choice of polarisation splitter means and its associated quarter wave plate means will be made taking an account of the frequency of operation having regard to the application in view and a choice may be made from a range of commercially available components including fibre optic couplers which afford a required polarising function as will be appreciated by those skilled in the microwave or optical signal transmission art as the case may be.

Although two main transmission channels are provided, further channels may be added by using time or frequency division multiplex techniques.

The two parts may conveniently be positionally arranged in axial alignment such that polarised signal energy passes from the polarising splitter means of one part through the two quarter wave plate means along a direct path to the polarising splitter means of the other part.

The two parts may be arranged in spaced apart relationship with an air space between the two quarter wave plate means. Lenses may be used to allow greater spacing between the quarter wave plates. Optical fibres may be used to link remotely positioned sources and detectors to the rotatable joint itself.

3. BRIEF DESCRIPTION OF THE DRAWING

One embodiment of the invention will now be described by way of example with reference to the accompanying drawing which is a somewhat schematic side view of a rotatable joint for an optical transmission line.

4. DETAILED DESCRIPTION OF THE DRAWING

Referring now to the drawing, a joint for an optical transmission line comprises two parts, 1 and 2, which are arranged for relative rotation. In this particular example the joint is used in an optical transmission line of a rotatable radar antenna array and thus the part 2 will generally be stationary, whilst the part 1 will be constrained to rotate with respect to it by means of a motor not shown. The parts 1 and 2 are generally similar in construction and comprise optical polarising beam splitters 3 and 4 respectively, the polarising beam splitter 3 being operatively associated with a quarter wave plate 5 whilst the polarising beam splitter 4 is operatively associated with a quarter wave plate 6. The parts 1 and 2 of the joint include two lasers 18 and 7 which are arranged to produce polarised optical signals one for each of two channels. In the present example the laser 18 is arranged to produce horizontally polarised light and the laser 7 is arranged to produce vertically polarised light. Light from the lasers 18 and 7 are fed via lenses 8 and 9 respectively to the polarising beam splitters 3 and 4 such that the channel signals are directed through a light pipe 10 in opposite directions as indicated by the arrows 11a and 11b. Although the light sources 18 and 7 in the present example are lasers, it will be apparent that the polarising beam splitters 3 and 4 serve to produce polarised light in one channel which is orthogonally related to light in the other channel and thus the sources 18 and 7 may, in an alternative embodiment be LED lasers, or other non-polarised light sources, but in these circumstances there will be an inevitable light loss and light from both sources will be dumped in a direction as indicated by arrows 12.

Optical channel signals having a mutually orthogonally polarised relationship are fed from the polarising beam splitters 3 and 4 to the quarter wave plates 5 and 6 thereby to produce corresponding circularly polarised channel signals of opposite rotational sense which travel in opposite directions. Thus one signal channel will be polarised circularly in a right hand sense and the other signal channel will be polarised circularly in a left hand sense (or vice versa). The circularly polarised channel signals will traverse an interface 13 between the two parts 1 and 2 and although in the present embodiment the interface is simply an air space, in alternative embodiments the quarter wave plates 5 and 6 may actually be arranged in lubricated contact with each other whereby the quarter wave plate 5 will rotate in contact with the quarter wave plate 6.

Circularly polarised light thus passes across the interface 13 to be converted by the quarter wave plates 5 and 6 back to signal channels having mutually orthogonal polarisation characteristics such as horizontal and vertical polarisation for example. These signals are fed from the quarter wave plates 5 and 6 to the polarising beam splitters 3 and 4 to produce output channel signals which are focused by lenses 14 and 15 respectively onto optical detectors 16 and 17 respectively whereby output channel signals are produced for each channel which correspond to the input channel signals generated at the light sources 18 and 7.

The arrangement described affords two channels suitable for duplex communication, the channels being transmitted in opposite directions. In an alternative arrangement however, two communication channels may be provided in one direction such that two signal transmitters are associated with one part of the joint and two signal receivers are associated with the other part.

Various modifications may be made to the arrangement just before described without departing from the scope of the invention and it will be appreciated by those skilled in the art that any beam splitter arrangement which will produce or pass orthogonally polarised related signals may be used for example of a kind using optical fibres and in the same way any suitable quarter wave plate may be used for example of a kind using birefringent crystals. In this connection it is envisaged that polarised light sources and polarisation sensitive detectors may be used in combination with non polarising signal splitters or conversely non-polarised light sources and detectors may be used with polarising signal splitters. A polarising detector may simply comprise a detector with a polariser in front of it. It will however be appreciated that the most efficient arrangement will be to use polarised sources and polarising signal splitters.

It will also be appreciated that an equivalent millimetric microwave system may be used in which a waveguide is used instead of the light pipe 10 and equivalent microwave polarising components are used for the polarising beam splitters 3 and 4 and the quarter wave plates 5 and 6. For example a grid polariser may be used to perform the polarising beam splitter function and a microwave circular polariser may be used to perform a quarter wave plate function at microwave frequencies.

It will be understood that by converting the orthogonally polarised output signals from the polarising beam splitters 3 and 4 to circularly polarised signals with the quarter wave plate 5 and 6 such that circularly polarised signals traverse the interface 13, problems which might otherwise arise due to the fact that the polarising beam splitters 3 and 4 are not in polarisation alignment are obviated.

The effective number of channels used may easily be increased by using frequency multiplexed sources or in-phase and quadrature carriers of the modulation, provided the modulation bandwidth can be handled by the laser sources and the detectors. In the case of optical frequency multiplexing it is feasible to make the polarisers sensitive to one optical frequency, allowing some stacking to occur. For electronic multiplexing, laser diodes and electro-optic modulators may be modulated at frequencies up to 10 or more GHz. Therefore, time or frequency multiplexing may be used to increase the effective number of channels.

I claim:

1. A communication line joint arrangement comprising two parts, at least one of the two parts being adapted for rotation relative to the other part by a means for rotation, and both parts being adapted for the transmission of at least two channels therebetween using electromagnetic energy, each part comprising beam splitter means operatively associated with quarter wave plate means, wherein the beam splitter means of the two parts are arranged to pass two orthogonally related polarised input channel signals to the quarter wave plate means associated therewith, so as to produce two corresponding circularly polarised channel signals of opposite directional sense which are transmitted between the quarter wave plate means, across an interface between the parts, so as to produce two corresponding orthogonally polarised output channel signals from the beam splitter means.

2. A line joint arrangement as claimed in claim 1 wherein each beam splitter means is fed with a respective channel signal such that the beam splitter means of each of the two parts is arranged to produce corresponding orthogonally related polarised channel signals which are fed to the quarter wave plate means associated therewith so as to produce two corresponding circularly polarised channel signals of opposite directional sense, which propagate in opposite directions between the quarter wave plate means to the beam splitter means thereby to produce two output channel signals one from each of the beam splitter means.

3. A line joint arrangement as claimed in claim 1 wherein two input channel signals are fed to one of the two beam splitter means so that the beam splitter means of one of the two parts is arranged to produce when fed with the two input channel signals, two corresponding orthogonally related polarised channel signals which are fed to the quarter wave plate means associated therewith so as to produce two corresponding circularly polarised channel signals of opposite directional sense, which propagate in the same direction, which circularly polarised channel signals are fed to the quarter wave plate means of the other of the two parts so as to produce corresponding orthogonally polarised channel signals which are fed to the beam splitter means of the other of the two parts thereby to produce two output channel signals which correspond to the input channel signals.

4. An arrangement as claimed in claim 1 wherein each beam splitter means is an optical beam signal splitter and each quarter wave plate means is an optical quarter wave plate such that the transmission of two channels comprising light signals is facilitated.

5. An arrangement as claimed in claim 4 operatively associated with two light sources one for each channel, and two optical detectors one for each channel.

6. An arrangement as claimed in claim 5 wherein the light sources are lasers.

7. An arrangement as claimed in claim 6 wherein the lasers are chosen to provide polarised light, and the detectors are polarisation sensitive.

8. An arrangement as claimed in claim 1 wherein the beam splitter means are polarising splitter means.

9. An arrangement as claimed in claim 1 wherein each beam splitter means is a grid polariser and each quarter wave plate means is a circular polariser such that transmission of two channels comprising microwave energy is facilitated.

10. An arrangement as claimed in claim 9 operatively associated with two microwave signal generators one for each channel and two microwave signal detectors one for each channel.

11. An arrangement as claimed in claim 10 wherein the two parts are arranged in spaced apart relationship with an air space between the two quarter wave plate means.

12. An arrangement as claimed in claim 1 wherein the two parts are positionally arranged in axial alignment such that polarised signal energy passes from the beam splitter means of one part through the two quarter wave plate means along a direct path to the beam splitter means of the other part.

* * * * *